(12) United States Patent
Black et al.

(10) Patent No.: US 8,986,080 B2
(45) Date of Patent: Mar. 24, 2015

(54) METHOD AND AN APPARATUS FOR REMOVING FAT FROM MEAT CUTS

(75) Inventors: Per Black, Ringsted (DK); Benny Lauritzen, Vojens (DK)

(73) Assignee: Teknologisk Institut, Taastrup (DK)

( * ) Notice: Subject to any disclaimer, the term of this patent is extended or adjusted under 35 U.S.C. 154(b) by 784 days.

(21) Appl. No.: 13/142,977

(22) PCT Filed: Jan. 20, 2010

(86) PCT No.: PCT/DK2010/050010
§ 371 (c)(1),
(2), (4) Date: Aug. 26, 2011

(87) PCT Pub. No.: WO2010/083838
PCT Pub. Date: Jul. 29, 2010

(65) Prior Publication Data
US 2011/0300279 A1    Dec. 8, 2011

(30) Foreign Application Priority Data

Jan. 23, 2009   (EP) ..................................... 09151270

(51) Int. Cl.
*A22C 25/00*   (2006.01)
*A22C 17/12*   (2006.01)
*A22B 5/16*    (2006.01)

(52) U.S. Cl.
CPC .................. *A22C 17/12* (2013.01); *A22B 5/166* (2013.01)
USPC ........................................................ 452/150

(58) Field of Classification Search
USPC ......... 452/149–151, 156, 157, 177–179, 125, 452/127
See application file for complete search history.

(56) References Cited

U.S. PATENT DOCUMENTS

| 3,542,105 | A |   | 11/1970 | Townsend et al. |
|-----------|---|---|---------|-----------------|
| 4,188,870 | A |   | 2/1980  | Schill          |
| 4,209,878 | A |   | 7/1980  | Albert          |
| 4,246,837 | A |   | 1/1981  | Chenery         |
| 4,811,459 | A | * | 3/1989  | Townsend ..................... 452/127 |

(Continued)

FOREIGN PATENT DOCUMENTS

| DE | 2258126 A1 | 5/1974 |
|----|------------|--------|
| EP | 0 324 522 A1 | 7/1989 |
| WO | WO-2004/106020 A1 | 12/2004 |

OTHER PUBLICATIONS

Supplementary European Search Report for Application No. EP10733258, dated Apr. 10, 2013.

(Continued)

*Primary Examiner* — Richard Price, Jr.
(74) *Attorney, Agent, or Firm* — Marshall, Gerstein & Borun LLP

(57) ABSTRACT

A method and apparatus for removing fat from one face of a meat cut, where a knife tool cuts a layer of fat and possibly skin from the face. The knife tool is adapted to cut across the entire width of said meat cut along a desired trimming interface. The knife tool includes at least two controllable blade parts, each having a cutting edge, the blade parts extending between the first face and a fat-to-lean interface without intersecting said first face. The position of said cutting edges and the angle of the blade parts are continuously adapted, by controlling the at least two controllable blade parts, to cut following the desired trimming interface, whereby the fat and possible skin is trimmed from the lean in one single piece of fat.

20 Claims, 6 Drawing Sheets

(56) References Cited

U.S. PATENT DOCUMENTS

Figure 1:
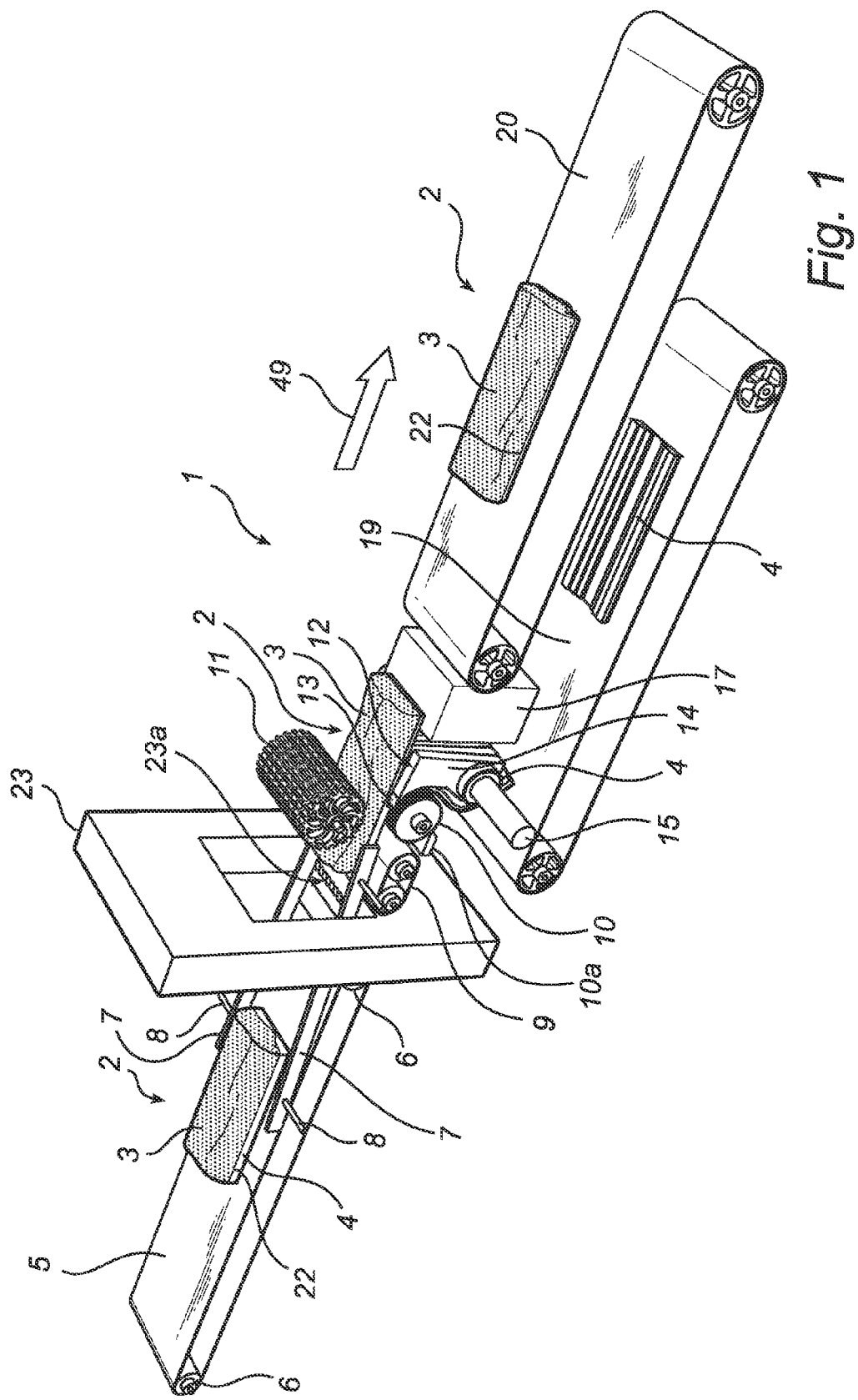

| | | | |
|---|---|---|---|
| 4,979,269 A | | 12/1990 | Norrie |
| 5,090,939 A | | 2/1992 | Leblanc |
| 5,288,264 A | * | 2/1994 | Braeger ........................ 452/127 |
| 5,334,084 A | | 8/1994 | O'Brien et al. |
| 5,476,417 A | | 12/1995 | Long et al. |
| 6,129,625 A | * | 10/2000 | Cate et al. ..................... 452/127 |
| 6,929,540 B2 | | 8/2005 | Johnson et al. |
| 7,001,261 B2 | | 2/2006 | Johnson et al. |
| 2001/0036807 A1 | | 11/2001 | Veldkamp et al. |
| 2002/0019208 A1 | | 2/2002 | Boody et al. |
| 2005/0079815 A1 | * | 4/2005 | Johnson et al. ............... 452/150 |

OTHER PUBLICATIONS

Search Report for PCT/DK/2010/050010, mailed Feb. 8, 2010 (2 pages).

* cited by examiner

METHOD AND AN APPARATUS FOR REMOVING FAT FROM MEAT CUTS

REFERENCE TO RELATED APPLICATIONS

This is the US national phase under 35 USC §371 of international patent application no. PCT/DK2010/050010, which claims priority to European Patent Appl. No. 09151270.7, filed Jan. 23, 2009, the entirety of which is incorporated herein by reference.

TECHNICAL FIELD

The present invention relates to a method and apparatus for removing or trimming fat from meat cuts.

Many standardised meat cuts, such as several cuts of pork, comprise a layer of subcutaneous fat and possibly the corresponding portion of the animal's skin (e.g. pork rind).

The thickness of a layer of fat on one face of a meat cut, such as subcutaneous fat, may vary considerably over a cut of meat, that is, along the main extension of the meat cut, and transversely to this extension—these two directions generally following the extension of the animal's skin. In such cases, it is necessary to remove a layer of fat having considerable variations in thickness in order to leave a layer of fat on the lean of the meat cut having a generally uniform thickness. Meat cuts having a thin layer of fat with a uniform thickness are in considerable market demand in modern times. However, the removed fat is normally also being utilised as a commercial product. In this respect it is of importance to trim the fat from the lean in one single piece of fat as the commercial value of the fat will otherwise decrease substantially.

Manual trimming of meat cuts in order to obtaining a thin, uniform layer of fat on the lean is quite difficult, and a time-consuming and strenuous work as well. Industrial injuries arising from such work are well known. Moreover manual trimming of the fat in one single piece is difficult.

PRIOR ART

Machines are known for removing (trimming) a layer of fat from a meat cut such as a pork side or a pork loin, in which the meat cut is forced along a conveyor and past a knife tool which is stationary in the direction of movement of the meat cut. The knife tool separates a layer of fat and possibly skin from the meat cut. The meat cut is normally conveyed with its fat side or fat-and-skin side facing downwards, usually resting on some form of conveyor.

One machine of this kind is known form U.S. Pat. No. 6,129,625. In this machine a knife tool with a single blade extending across the entire width of the meat cut is used. The thickness of inter alia the fat on the meat cut is measured upstream of the knife tool using an ultrasonic or x-ray sensor. The knife tool is continuously adjustable by moving either or both ends of the single blade up and down in order to follow in a de-sired fashion the fat-to-lean interface of the meat cut while the meat cut is being forced past the knife tool, so that more fat is cut from the lean, or so that a layer of fat having a desired thickness is being left on the lean. The blade may have a predetermined advantageous curvature. Still, however, even with the curvature the performance of this machine leaves very much indeed to be desired when it comes to producing cuts of meat having a layer of fat left on the lean having a uniform or near to uniform thickness.

In another machine known from U.S. Pat. No. 7,001,261, the knife tool consists of four U-shaped knife blade loops, which are not individually deformable but each of which are continuously adjustable in height so that the knife tool viewed as a whole may attain the shape of a stepped curve when viewed in the direction of motion of the meat cut. The adjustment in height of each knife blade loop may be achieved in that the angle of inclination of that loop is adjustable during the cutting process, so that the loop will tend to be lifted upwards or pressed downwards within the layer of fat, as its angle of inclination is increased or reduced, much the way in which an airplane's ailerons function.

Even if this knife tool viewed as a whole is thus adaptable to a certain degree to variations in the fat-to-lean interface, both in the direction of movement of the meat cut and transversely to this direction, each knife blade loop will necessarily cut its own strip of fat from the meat cut, and the removed fat will thus be divided into as many strips as there are knife blade loops in the knife tool. This will adversely reduce the commercial value of the fat.

U.S. Pat. No. 4,246,837 teaches a fat trimming apparatus of the kind mentioned above, in which the thickness of fat is sampled at several positions along the meat cut, at positions distributed in the direction of conveyance and optionally distributed transversely to the direction of conveyance as well. Sampling is made while the meat cut is kept at a standstill. The meat cut is subsequently forced in a horizontal direction past a knife blade in the cutting station, while the knife blade is continuously adjustable in a vertical direction so as to vary the thickness of the layer of fat cut from the lean along the meat cut. It is mentioned that the knife blade may be movable as well so as to vary its inclination, while it remains unclear which direction of inclination is meant.

From EP 324 522 a knife tool which is subdivided into a number of sections, each having a linearly movable blade part is shown. The meat cut being moved by a toothed traction roller in a direction of transport towards the knife tool. In accordance with measurements on the meat cut, each of the blade parts may be controlled to perform a sliding motion in the vertical direction, i.e. perpendicular to the direction of transport of the meat cut.

Instead of continuously adjusting the knife blade in a vertical direction, it is briefly mentioned in U.S. Pat. No. 4,246, 837 that the position of the meat cut relative to the knife blade may be adjusted. It is briefly mentioned as well in this paper that the meat cut may be held stationary and the knife tool forced though the fat layer of the meat cut.

OBJECT OF THE INVENTION

The object of the present invention is to provide an improved method and an improved apparatus for removing fat from meat cuts, where essentially all subcutaneous fat is removed form the lean of the meat cut, or where a layer of fat having a desired and uniform thickness is left on the lean. It is part of the object that the fat is to be removed as one single piece of fat.

SUMMARY OF THE INVENTION

According to a first aspect of the invention there is provided a method for removing fat from a first face of a meat cut, said meat cut having a length and a width, and said first face extending along said length and said width, the method comprising: estimating the shape and position of a fat-to-lean interface in said meat cut, pressing said first face of the meat cut against a support extending in a direction transverse to a transport path, moving the meat cut in its lengthwise direction along a transport path and past a knife tool having a cutting edge, whereby the knife tool cuts a layer of fat and possibly skin from said first face, the knife tool being adapted to cut across the entire width of said meat cut so as to allow the trimming of the fat with possible skin from the rest of the meat cut as one single piece of fat, the method being characterized in determining, based on said estimated shape and position of a fat-to-lean interface, a desired trimming interface extending along the length and width of said meat cut, providing a knife tool comprising at least two controllable blade parts, each blade part having a cutting edge, the blade parts extending between said first face and said fat-to-lean interface without intersecting said first face, and continuously adapting, by controlling said at least two controllable blade parts, a position of each of said cutting edges and an angle of each of said blade parts with respect to said support to cut following said desired trimming interface, whereby the fat with possible skin is trimmed from said lean as said one single piece of fat.

According to a second aspect of the invention there is also provided an apparatus for removing fat from a first face of a meat cut, said meat cut having a length and a width, and said first face extending along said length and said width, said apparatus comprising: conveying means for moving the meat cut along a transport path, a support ex-tending in a direction transverse to a transport path, wherein said conveying means is adapted for moving the meat cut in its lengthwise direction along said transport path and past a knife tool with a cutting edge whereby the knife tool cuts a layer of fat and possibly skin from said first face, the knife tool being adapted to cut across the entire width of said meat cut so as to allow the trimming of the fat and possible skin from the rest of said meat cut as one single piece of fat, the apparatus being characterized in further comprising means for determining, based on an estimated shape and position of a fat-to-lean interface, a desired trimming interface extending along the length and width of said meat cut, a knife tool comprising at least two controllable blade parts, each comprising a cutting edge, the blade parts extending between said first face and said fat-to-lean interface without intersecting said first face, means for continuously adapting, by controlling said at least two controllable blade parts, a position of the cutting edges and an angle of each of said blade parts with respect to said support to cut following said desired trimming interface, whereby the fat and possible skin is trimmed from said lean as said one single piece of fat.

By providing a machine having means for determining, based on an estimated shape and position of a fat-to-lean interface, a desired trimming interface extending along the length and width of said meat cut, a knife tool comprising at least two controllable blade parts, each comprising a cutting edge, the blade parts extending between said first face and said fat-to-lean interface without intersecting said first face, means for continuously adapting, by controlling said at least two controllable blade parts, the position of cutting edges and the angle of each of said blade parts to cut following said desired trimming interface, it becomes possible to cut the fat from the lean in essentially one piece, while at the same time leaving a relatively constant and desired thickness of fat on the lean. This is desirable as the thickness of fat on the lean can be controlled closely to what the consumer will tolerate, thus ensuring a high market value of both the fat and the lean. At the same time the remainder of the fat is cut away in one piece, which in turn ensures a higher market price for this part of that fat than could be achieved if it was in several smaller pieces.

In particular the fact that an angle of the blade part relative to the support, as well as the position of the cutting edge, i.e. the distance of the cutting edge from the support, are controlled, allows for a very fine trimming. By changing not only the position so as to increase the distance from the support but also the angle allows for better and more precise movement of the cutting edges within the fat. When the knife tool is moved, it has to overcome forces occurring in the vertical direction between the knife tool and the meat cut. These forces arise from toughness of the fat being cut resisting shear forces of the knife tool, including the non-cutting parts thereof, in the vertical direction. These shear forces must not exceed the sum of the gravitational force on the meat cut and the pressure from the pressure roller normally employed to force the meat cut against the support. If this happens the meat cut will be lifted off the support, leading to an imprecision in the cutting.

The shear forces also lead to a compression of the meat cut, which, in turn, could also lead to lack in precision of the cutting. When the angle of the blade part is changed towards the vertical direction in which the knife tool is to be moved the shear forces are reduced because the cutting edge of the blade part, starts to cut in the desired direction, thereby clearing its way through the meat cut and thereby thus reducing the shear forces.

Another advantage is that the meat part already separated from the fat does not need to be lifted very far because the trailing parts of the knife tool, i.e. the parts behind the leading edge constituted by the cutting edge, need not to be moved very far in the vertical direction. Therefore the risk of lifting the uncut part of the meat cut free of the support due to forces transferred from the part already cut free, when the latter is to move over the knife tool, is reduced. If the uncut part of the meat cut is lifted this way, precision of the cut is reduced as already explained above, because the distance of the lean from the support does no longer match the thickness of the fat.

Furthermore, by changing the angle in question as explained, the cutting edge of the blade part of the knife tool will have a natural tendency to move up and down in the fat, as the angle of attack changes, thus making the cutting much more precise in terms of following thickness variations in the direction of transport of the meat cut.

According to a first preferred embodiment of the first aspect of the invention said at least two controllable blade parts are so controllable that each cutting edge of said at least two controllable blade parts may be brought into and away from a position, in which it, together with an adjacent cutting edge, forms a continuous cutting edge, extending exclusively between said first face and said fat-to-lean interface. Experience has shown that even if the various blade parts do not fully constitute a continuous cutting edge, the fat still get trimmed efficiently from the lean in one single piece of fat. Smaller "bridges" of fat left between the piece of lean and the piece of fat have shown to provide no problems, as they are very easily broken.

According to a further preferred embodiment of the first aspect of the invention, each of said at least two controllable blade parts are swingable about an axis extending transverse to said lengthwise direction and parallel to said support. Thereby a large number of degrees of freedom in control of each individual cutting edge may be achieved.

According to another preferred embodiment of the first aspect of the invention, said at least two controllable blade parts are swingable about a common axis. By using a common axis such as a shaft, a good mechanical resistance to the forces from the meat cut against the blade parts is achieved, albeit at the expense of the large number of degrees of freedom mentioned above.

According to a further preferred embodiment of the first aspect of the invention said shape and position of the fat-to-lean interface is estimated based on experience values and the dimensions and the weight of the meat cut. The build or bodily constitution of slaughter animals often falls within a limited number of types, and thickness-of-fat distribution data for each type may be registered. The thickness-of-fat distribution for a particular meat cut may then be reproduced with satisfactory precision on the basis of the stored data for its type, together with its size and/or weight. This obviates the need for any elaborate measuring devices for performing measurements within the meat cut. Instead the external dimensions of the meat cut can be used, and these may be measured in an entirely separate process step.

However, according to an alternative embodiment of the first aspect of the invention said shape and position of the fat-to-lean interface is estimated measuring the thickness of said layer of fat and possibly skin by invasive or non-invasive measuring. This allows a precise and direct measurement to be performed just before the cutting.

According to a preferred embodiment of the first aspect of the invention, the meat cut is moved past the measuring station in a continuous motion. Moving the meat cut past the measuring station in a continuous motion speeds up the process and thus increases the efficiency of the cutting process. Moreover, the measuring station can be made short in the direction of transport.

According to another preferred embodiment of the first aspect of the invention, the support is a roller. Using a roller allows good separation of the fat and lean as one of the parts will follow the roller, e.g. by sticking thereto or under the influence of gravitation, and be directed away from the other part.

According to a further preferred embodiment of said first aspect of the invention, said trimming interface essentially coincides with said fat-to-lean interface, whereby all fat is cut from the lean. Fully separating the fat from the lean may increase the value of the lean cut for consumers with a focus on low fat diet, the consumers thus being willing to pay an increased price. Moreover, trimming all fat from the lean by hand is a particularly difficult and time-consuming process, and it is virtually impossible to obtain the fat as a single piece of fat by manual trimming.

According to a first preferred embodiment of the second aspect of the invention, said at least two controllable blade parts are so controllable that each cutting edge of said at least two individually controllable blade parts may be brought into and away from a position, in which it, together with an adjacent cutting edge, forms a continuous cutting edge, not intersecting said first face, that is, the edge is extending exclusively between said first face and said fat-to-lean interface. Experience has shown that even without a continuous cutting edge the fat still get trimmed efficiently from the lean in one single piece of fat.

According to a further preferred embodiment of the second aspect of the invention, each of said at least two controllable blade parts are swingable about an axis extending transverse to said lengthwise direction and parallel to said support. Thereby a large number of degrees of freedom in control of each individual cutting edge may be achieved.

According to another preferred embodiment of the second aspect of the invention, said at least two controllable blade parts are swingable about a common axis. By using a common axis such as a shaft, a good mechanical resistance to the forces from the meat cut against the blade parts is achieved, albeit at the expense of the large number of degrees of freedom mentioned above.

According to different preferred embodiment of the second aspect of the invention, said means for estimating the shape and position of a fat-to-lean interface in said meat cut comprises a database holding records with experience values for shape and position of the fat-to-lean interface for specific dimensions and weight of meat cuts, i.e. of fat thickness distribution in dependency of dimensions and weight of meat cuts. These may then be matched to dimensions and weight of the actual piece of meat to be processed. Thus, the need for any elaborate measuring devices for performing measurements within the meat cut is obviated. Instead the external dimensions of the meat cut can be used, and these may be measured in an entirely separate process step.

However, according to an alternative embodiment according to the second aspect of the invention, the apparatus comprises a measuring station for measuring the thickness of said layer of fat and possibly skin. This allows a precise and direct measurement to be performed just before the cutting, rather than just relying on experience values, which in turn allows a more precise cutting.

According to a preferred embodiment of the second aspect of the invention the apparatus is adapted to move the meat cut past the measuring station in a continuous motion. Moving the meat cut past the measuring station in a continuous motion speeds up the process and thus increases the efficiency of the cutting process. Moreover, the measuring station can be made short in the direction of transport.

According to another embodiment of the second aspect of the invention the support is a roller. Using a roller allows good separation of the fat and lean as one of the parts will follow the roller under the influence of gravitation immediately after the cutting and be directed away from the other.

Figure 2:
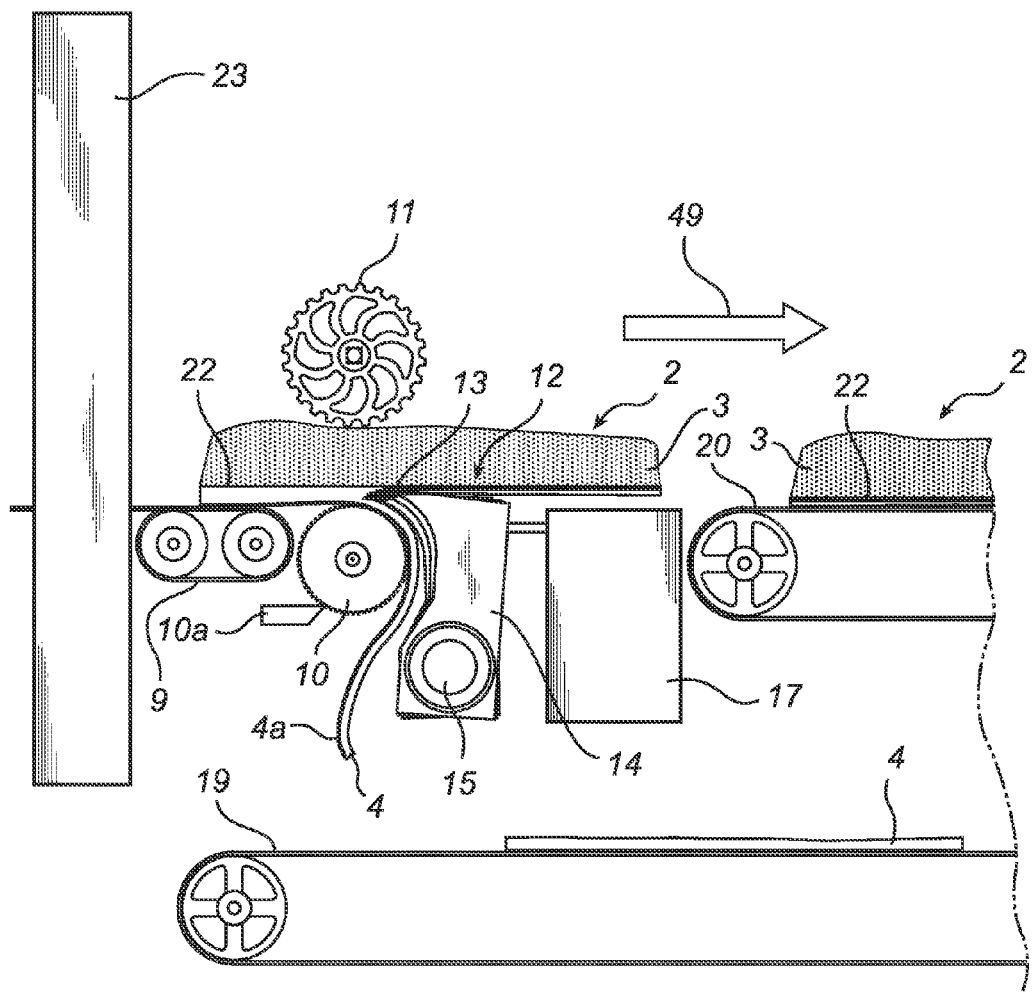
Figure 3:
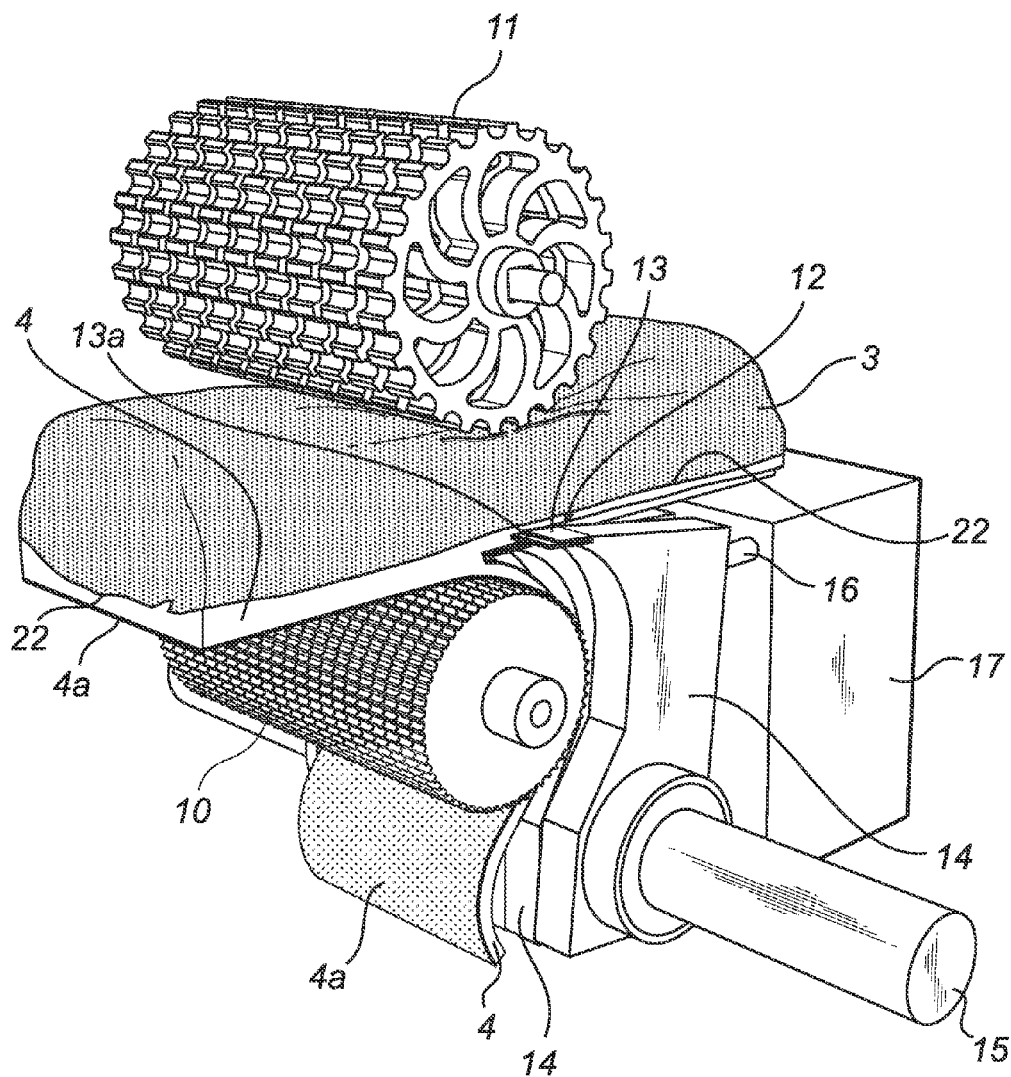
Figure 4:
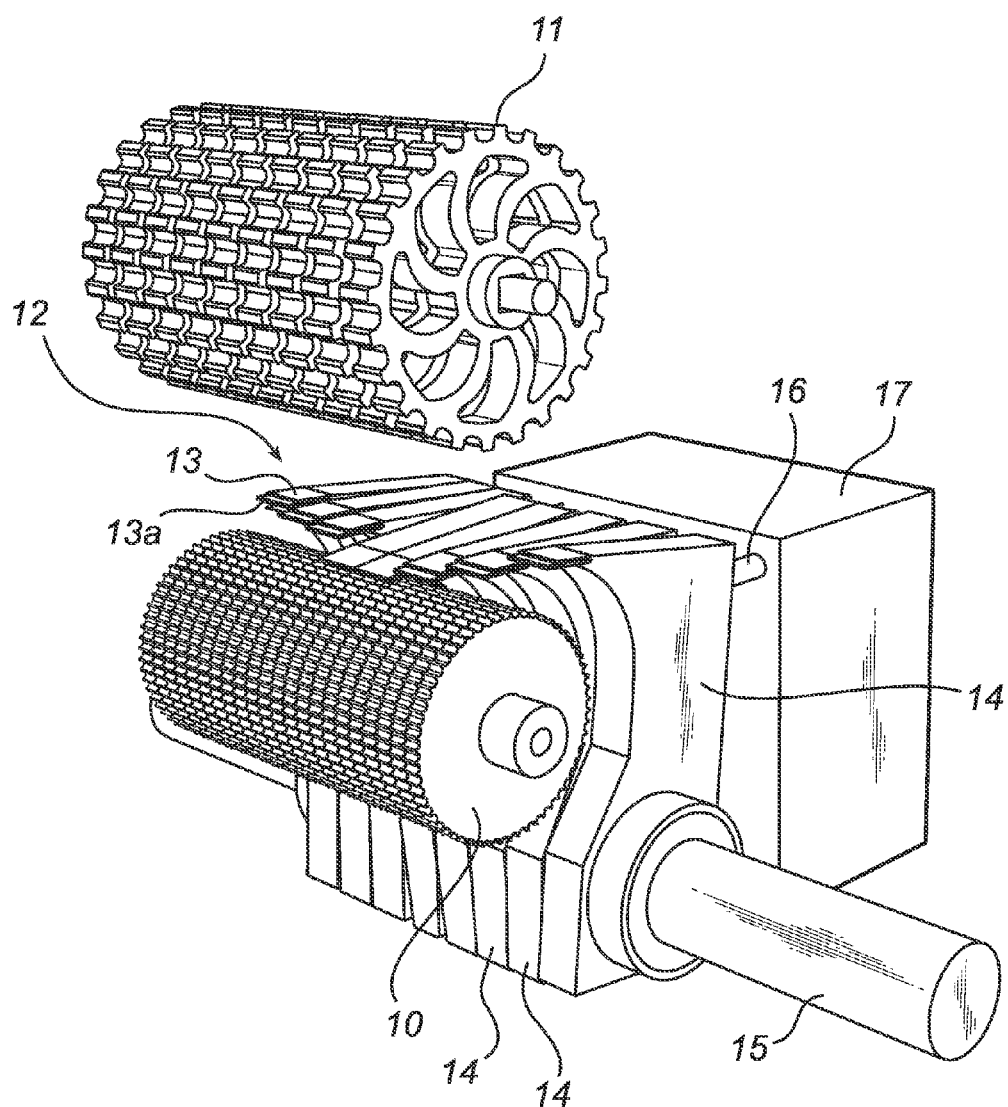
Figure 5:
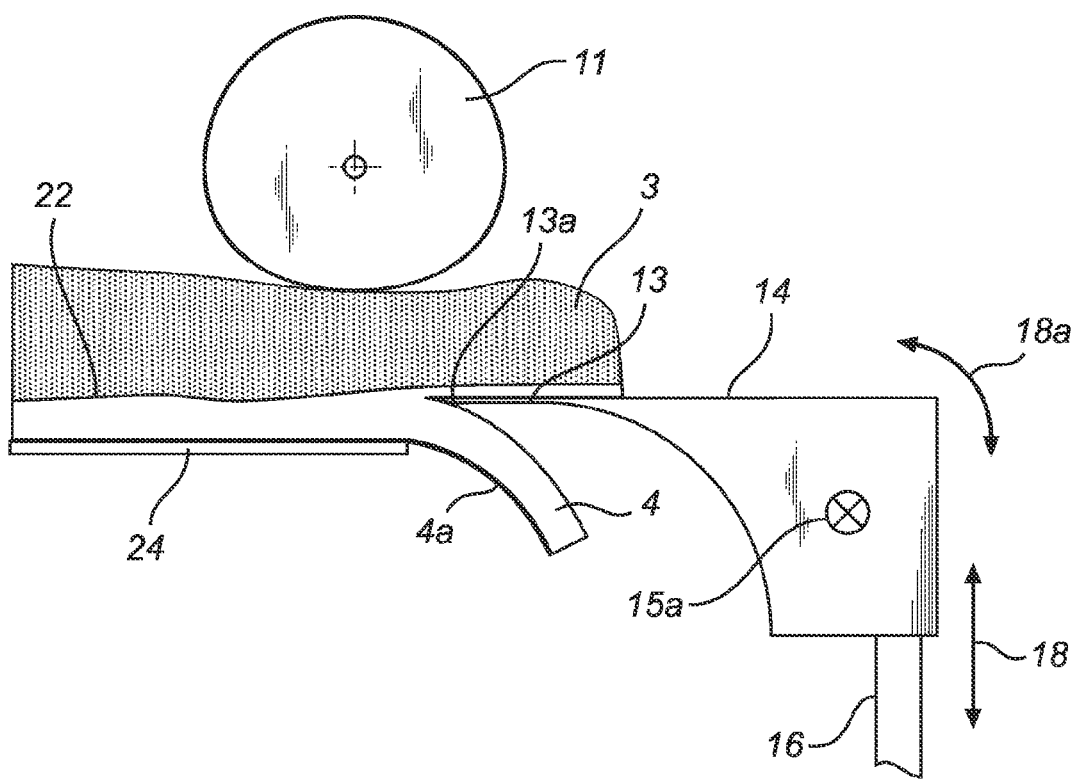
Figure 6:
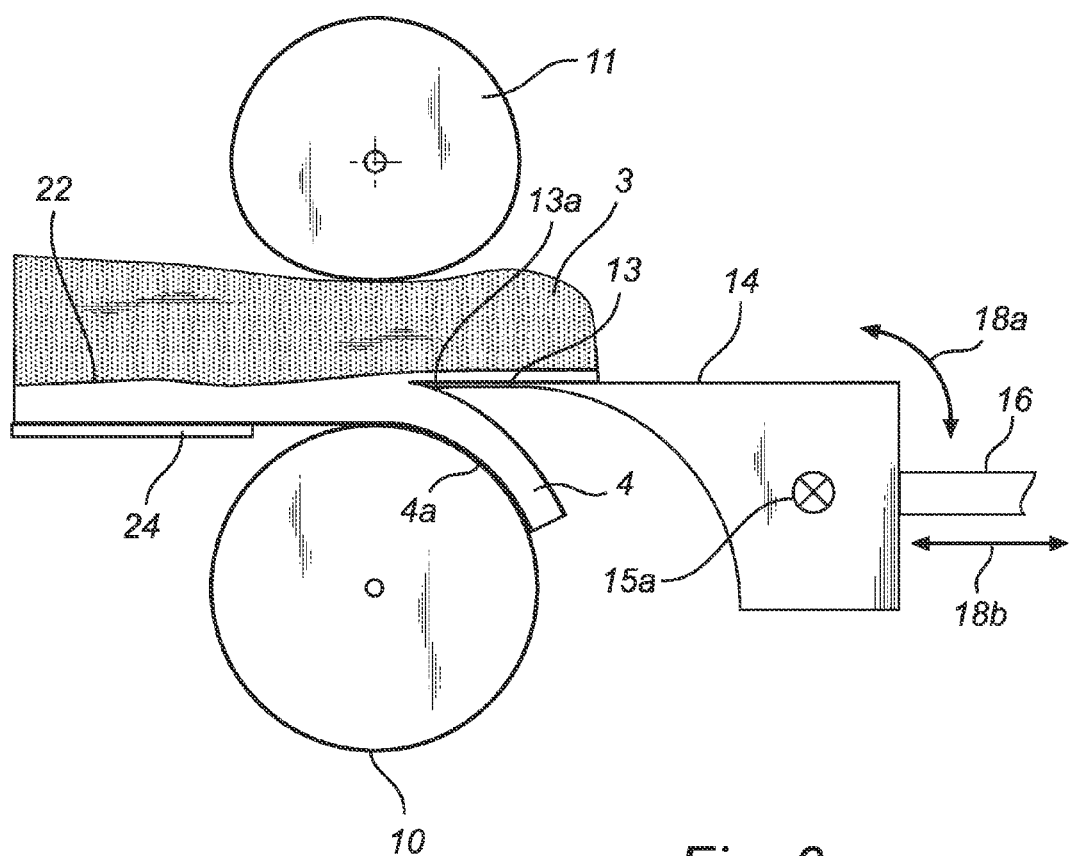

The invention will now be described in more detail based on exemplary embodiments and with reference to the drawings, on which:

FIG. 1 schematically shows meat cuts in a fat removing machine according to the invention, FIG. 2 schematically shows details of the middle section of the fat removing machine of FIG. 1, FIG. 3 schematically shows essential components of the middle section in FIG. 2 and a meat cut being processed, FIG. 4 corresponds to FIG. 3, and shows a currently preferred embodiment of the knife tool according to the invention in more detail, without meat, FIG. 5 schematically shows a second embodiment of a knife tool according the invention, and FIG. 6 schematically shows a third embodiment of a knife tool according to the invention.

In the drawings, the lean 3 of the meat cut 2 is generally designated by a dense hatching whereas the fat 4 of the meat cut 2 is white. In FIG. 3, the surface of the rind 4a on the first face of the meat cut 2 is hatched in a hatching darker than the hatching of the fat 4, but lighter than the hatching of the lean 3. Apart from that the rind 4a is also indicated by a thick line. These hatchings do not designate cross sectioning; all meat cuts are shown in end view, side view or oblique view. The two types of hatching are merely indicating the two types of tissue in the meat cut 2 in the same way as two different colours.

FIG. 1 schematically shows a fat removing machine 1. For illustration purposes, however, only relevant parts are shown. Stationary parts such as framework and support, which are not as such relevant for the invention, have been omitted. In the fat removing machine, a number of meat cuts 2, such as pork loin, are shown. As can be seen, one meat cut 2 is being processed and is already partially separated into two parts, namely into a lean part 3 and a fat part 4.

Though referred to as a fat part 4, the skilled person will know that the fat part to be separated from the lean part may often also include a skin part 4a, as e.g. seen in FIG. 2 or 3.

Consequently, in this description the term fat part 4 is to be understood as possibly including a skin part 4a, e.g. the rind, unless otherwise stated.

The fat removing machine 1 comprises an upstream conveyor for bringing the meat cuts 2 to the cutting section of the fat removing machine 1. In the illustrated embodiment this conveyor is a conveyor belt 5, running as an endless belt over a number of rollers 6, here two rollers 6. The skilled person will know that other types of conveyors may be used instead.

For positioning the meat cuts 2 in the sideways direction across the conveyor belt 5 a pair of guide plates 7, which are controlled and supported via guide plate bars 8 are placed at least partially over the conveyor belt 5. From the conveyor belt 5 the meat cuts pass via a measuring station 23 onto an intermediate conveyor, in the present embodiment also a conveyor belt 9. The conveyor belt 9 is shorter but may otherwise correspond in construction to the conveyor belt 5. After the intermediate conveyor belt 9, the meat cuts enter the nip between a toothed traction roller 10, which is rigid, and a resilient traction roller 11. The toothed traction roller 10 and the resilient traction roller 11 grip the meat cut 2 with sufficient engagement force to press it past a knife tool 12 (best seen in FIGS. 2 to 4). In the embodiment shown, the knife tool 12 comprises a number of blade parts 13 mounted in individually controllable blade part supports 14 and having cutting edges 13a (not visible in FIG. 1).

The individually controllable blade part supports 14 are controlled in response to measurements made in the measuring station 23. Preferably, in the measuring station 23 measurements of the thickness of the fat 4 are made at appropriate points across the width and along the length of the meat cut 2, e.g. using a number of discrete measuring devices 23a as illustrated in FIG. 1. The skilled person will understand that this is merely an illustrative example, and that the number and location of measuring devices may differ, or even be not visible if, as will be described further below, a CT-scanner is used. These measurements, which represent an estimate of the three-dimensional shape of a fat-to-lean interface 22, as well as the location or position thereof, are then stored and subsequently used for the control of the knife tool 12, i.e. the position of the cutting edges 13a of the blade parts 13 are controlled in dependence of the measurements. In this respect, it should be noted that with a sufficient number of measurements, each with a high degree of precision, the estimate may for all practical purposes be equated to an actual determination of the location of the three dimensional fat-to-lean interface as well as the shape thereof. Alternatively, measurements of other characteristics of the meat cut 2, e.g. the external dimensions and weight are made, and used for identifying, in a database, typical values, i.e. experience values, of the distribution of the thickness of the fat 4 and thus the curvature and position of the fat-to-lean interface 22. In that case these typical values are then used for the control of the knife tool 12.

Alternatively, combinations may be utilized of a lower number of actual measurements and stored values from a database. The skilled person will be able to point to a strategy for this on the basis of the present disclosure.

During cutting, the toothed traction roller 10 serves as a support for the meat cut 2 providing a well-defined position of the rind face 4a of the meat cut, and thus of the fat-to lean interface. As can be seen from FIG. 1 the toothed traction roller 10, and thus the support, extends essentially linearly in the direction perpendicular to the lengthwise direction of the transport path and exceeds the width of the meat cut 2, allowing it to serve as a reference for the control of a knife tool 12.

Associated with the toothed traction roller 10 there may be a likewise toothed scraper bar 10a, which scrapes rind debris from the toothed traction roller 10. Such toothed traction rollers 10 and scraper bars 10a, as well as resilient traction rollers 11, are well known per se.

Turning now to FIG. 4, it can be seen that this embodiment of the knife tool 12 comprises a number of blade part supports 14 in which blade parts 13 with cutting edges 13a are mounted. The blade part supports 14 themselves are mounted pivotally on a shaft 15 and controlled individually via control rods 16 (not visible in FIG. 1) by appropriate actuators located in an actuator box 17, so as to allow the actuators to move the blade parts 13 with the cutting edges 13a. The specific type of actuators used is not important for the invention, and could e.g. be spindle actuators, pneumatic or hydraulic actuators, they must however be able to withstand the force necessary to cut the meat, so as not to yield when the meat cut 2 is forced against the blade parts 13 by action of the toothed traction roller 10 and the resilient traction roller 11, and to move the blade part supports 14 at a relevant speed.

In the illustrated embodiment the blade parts 13 are separate elements, which are mounted on blade supports 14 of the knife tool 12 in an interchangeable manner, allowing each blade part 13 to be removed and replaced when it needs to be sharpened or if it breaks or gets worn down. This skilled person will know various ways to achieve this, and he will also realise that the blade parts 13 could be an integral part of the knife tool 12 or of the blade supports 14.

As can be seen in FIG. 4, the position of the individual blade part supports 14 and hence the position of the cutting edge 13a of the blade part 13 may be varied with respect to the toothed traction roller 10 by individual pivoting of the blade supports about a common axis, in the form of a shaft 15, so as to increase or decrease the distance from the support provided by the toothed traction roller 10 to each cutting edge 13a. Thus, by individually varying the positions of the blade part supports 14, the thickness of the fat 4 cut from the meat cut may be varied for each blade part, over the entire width of the meat cut 4. Hereby each of the individual cutting edges 13a will not move outside the fat 4, i.e. they will remain inside the space delimited by the first face, here the rind 4a, which is pressed against the toothed traction roller 10, and the fat-to-lean interface 22. This space corresponds directly to the volume of the subcutaneous fat on meat cut 2. Due to the rotation about the shaft 15, the angle of the respective blade parts 13 with the cutting edges 13a also change with respect to the support provided by the toothed traction roller 10. This changes the angle of attack of the cutting edges 13a of the blade parts 13, allowing them to move through the fat without excessive shear forces, and thus without pressing the meat cut unnecessarily against the roller 11 and the force of gravitation on the meat cuts. Moreover, due to this motion of the blade supports 14, the blades are farther away from the location of maximum pressure from the roller 11 when moving upwardly, and the tendency to compress the meat cut thus reduced.

In order to adjust the thickness of the fat to be cut, it suffices to merely adjust the distance of the blade part supports 14, and hence the blade parts 13, from the toothed traction roller 10. This is because the fat 4, in particular the cut away part of the fat 4 will have a tendency to follow the toothed traction roller 10, and the thickness of the fat 4 cut away will therefore mostly depend on the radial distance of the cutting edge 13a from the toothed traction roller 10. The cut away part of the fat 4 will follow the toothed traction roller 10, in part due to gravitation as can be seen in FIGS. 1 and 2, where the fat 4 falls down towards a first downstream conveyor belt 19, and in part due to adhesion of the fat part to the roller 10. Though not visible in FIGS. 1 and 2 there is also a tendency for the fat 4 to stick to the toothed traction roller 10 because of the teeth, which dig into the fat 4 or the rind 4a, as the case may be.

Irrespective of any tendency of the fat to stick to the roller 12 it is to be understood that the main direction of transport 49 of the meat cuts 2 is tangential to the top of the roller 10 or rather parallel to a tangent to the top of the roller surface, the tangent being transverse to the top generatrix of the roller surface and coinciding essentially with the top surfaces of the conveyor belts 5, 9, 20. In accordance with this understanding, it is to be understood that wherever in this description reference is made to the angle of blade part 13 with respect to a roller 10, this reference should be understood as the angle with respect to this tangent. In other cases, such as when the support comprises an essentially plane surface, the angle is to be understood in an ordinary sense, i.e. with respect to the general extension of this surface, which would normally be in parallel with the main direction of transport 49.

As also seen in FIGS. 1 and 2, the separated pieces of fat 4 and lean 3 continue along different paths. As already mentioned, the fat 4 falls downward onto a first downstream conveyor belt 19, by which it is moved out of the fat removing machine 1. The lean 3 on the other hand continues in an essentially horizontal motion over the blade part supports 14 and the actuator box 17 onto a second downstream conveyor belt 20 and out of the fat removing machine 1, typically for further manual processing at a station at the end of the second downstream conveyor belt 20.

With respect to the pivotal motion of the blade part supports 14 it should be noted that this motion not only involves a retracting or approaching motion of the cutting edges 13a of the blade parts 13 away from and towards the toothed traction roller 10 in the direction of trans-port, but also to some degree involves a motion in the vertical direction. However, with appropriate arrangement of the blade part supports 14 this latter motion is minute and does not really play a role for the actual radial distance as compared with the retracting or approaching motion in the horizontal direction. Thus, the tendency of the blade parts 13 and the blade part supports 14 to compress the meat cuts 2 against the roller 11 is reduced. Moreover, despite the fact that bridges of fat 4 not severed from the lean 3 could be expected, because of the abrupt position differences between adjacent cutting edges 13a, experiments have shown that the fat 4 is still separated from the lean 3 in one piece across the entire width of the meat cut 4. That is to say, the discontinuities between the cutting edges 13a of the individual blade parts 13 are not so big that the local absence of a cutting edge leaves interconnecting bridges between the fat 4 and the lean 3. Consequently, despite the minor discontinuities the cutting edges 13a of the knife tool 12 can be regarded as providing a practically continuous cutting edge across the entire width of said meat cut, thereby allowing the fat 4 to be trimmed from the from the lean 3 as one single piece of fat 4.

Having estimated the shape of the fat-to-lean-interface 22 in the meat cut, it is, with appropriate control, e.g. by means of a computer, of the actuators, possible during cutting to continuously adjust the individual positions of the cutting edges 13a of the blade parts 13 to generally follow the shape of the fat-to-lean-interface 22 at a desired distance. Thus an almost uniform thickness of the layer of fat 4 remaining on the lean 3 is provided. How closely the shape of the fat-to-lean-interface 22 can be followed depends inter alia of the number of blade part supports 14 and the width of the cutting edges 13a of the blade parts 13 mounted thereon. Evidently, a large number of narrow blade parts 13 will allow for a higher precision, albeit at the expense of complexity. In this respect, it should be noted that not all of the cutting edges 13a of the blade parts 13 need to have the same width. Complexity can be reduced by using wider cutting edges 13a at locations where the fat-to-lean-interface 22 is generally parallel with the support provided by the toothed traction roller 10. In some meat cuts 2, e.g. depending on the type of cut, the fat-to-lean-surface may be flat over larger areas, and without major discontinuities. In such cases only a few blade parts will be necessary to achieve sufficient precision. Neither do the cutting edges 13a have to be horizontal.

Though the embodiment described above is currently preferred, the inclination of the cutting edges 13a of the blade parts in the direction of transport 49, i.e. to change the angle of attack, may be realised in different ways.

Thus FIG. 5 shows a knife tool of a second embodiment of the invention. Basically, the number of knife tools used would be the same as in the embodiment of FIGS. 1 to 4, but for illustration purposes only a single knife tool is shown. The blade part 13 with the cutting edge 13a is mounted on a blade part support 14. The blade part support 14 is movable in the vertical direction as indicated by the double arrow 18 by means of a control rod of an actuator 16, not shown. The blade part support 14 is arranged in a pivotal manner, allowing it to pivot about an axis 15a, as indicated by the double arrow 18a, under control of an actuator, not shown. However, unlike the embodiment of FIGS. 1-4, the axis 15a is not shared with other blade part supports 14 but individual to that particular blade part support 14. This increases the flexibility of the knife tool, because the angle of the blade part 13 is not linked to the distance between the cutting edge 13a and the support, as is the case in the embodiment according to FIGS. 1-4. As regards the support, it should be noted that the embodiment of FIG. 5 is illustrated with a flat support 24 rather than a roller 10. The choice between these two supports is a design option, and the two are considered interchangeable between the embodiments. Even if this might provide for greater flexibility and a cleaner cut and might reduce fiction, this embodiment is currently not preferred in order to keep down the complexity of the knife tools 12 and the control mechanisms, e.g. necessitating in principle twice as many actuators and individual control thereof.

FIG. 6 shows a knife tool of a third embodiment of the invention. In this embodiment the number of knife tools used would also basically be the same as in to the embodiment of FIGS. 1 to 4 or 5, but again, for illustration purposes, only a single knife tool is shown. The blade part 13 with the cutting edge 13a is mounted on a blade part support 14. The blade part support 14 is movable in the horizontal direction as indicated by the double arrow 18b by means of a control rod of an actuator 16, not shown. The blade part support 14 is arranged in a pivotal manner, allowing it to pivot about an axis 15a, as indicated by the double arrow 18a, under control of an actuator, not shown. Like the embodiment of FIG. 5, the axis 15a is not shared with other blade part supports 14 but individual to that particular blade part support 14. This increases the flexibility of the knife tool, as also in this case the angle of the blade part 13 is not linked to the distance between the cutting edge 13 and the support. As regards the support, it should be noted that the embodiment of FIG. 6 is illustrated with support in the form of a roller 10 to emphasize that the supports are interchangeable between embodiments. Even if this embodiment is more rugged than that of FIG. 5 because the actuator rods 16 align with the direction of transport this embodiment is also currently less preferred, because it has a higher complexity of the knife tools 12 and the control mechanisms, also necessitating in principle twice as many actuators and individual control thereof, as compared to the embodiment of FIGS. 1-4.

The overall control of the fat removing machine will now be described. For the operation of a fat removing machine 1 of the present invention, appropriate control of the knife tool 12 is necessary, along with appropriate control of the various other mechanical components of the machine.

In general, the elements, such as the conveyors 5, 9, 19, 20, the blade parts 13, the control rods 16, will be displaced by computer control via suitable actuators and mechanisms. In respect of computer hardware, actuators and mechanisms for displacing the elements, etc., the skilled person will be able to point to useful solution details on the background of the present disclosure.

In the embodiments the cutting edges 13a of the knife tools 12 are adjusted to the curvature and position of the fat-to-lean interface 22 inside that particular portion of the meat cut 2, which is present at the knife tool 12 of the fat removing machine 1, i.e. corresponding to the momentary position of the meat cut 2 in the direction of transport.

Information on the shape and position of the fat-to-lean interface 22, as well as information on the position of the meat cut 2 in the direction of transport is thus to be supplied to a control computer in the fat removing machine 1, and the control computer will have to displace the cutting edges of the knife tools accordingly via suitable actuators and mechanisms, such as the control rods 16, the blade part supports 14, etc.

In a first embodiment of a computer control system for the fat removing machine 1, the information on the curvature and position of the fat-to-lean interface 22, that is, in general a total mapping of this interface must preferably be available before the meat cut 2 is fed into the fat removing machine 1. On the basis of this information and on the basis of the momentary position of the meat cut 2 in the direction of transport, the computer control system will generate consecutive sets of data for curvature and position of the fat-to-lean interface 22 as seen in a cross-section of the meat cut 2, taken immediately forward of the knife tool 16. The control computer will then continuously position the relevant elements in accordance with these sets of data.

The mapping of the fat-to-lean interface 22 in a meat cut 2 from which fat is to be removed, i.e. determining the location and shape of the fat-to-lean interface 22 in a meat cut from which fat is to be removed, in order to obtain a map of the interface, may be made at a separate measuring station 23 (shown in FIGS. 1 and 2) placed upstream of the fat removing machine 1, and the map data for the entire meat cut 2 may then be transmitted to the machine's control computer for use when the meat cut 2 enters the machine 1. Determining the location and shape of the fat-to-lean interface 22 in a meat cut from which fat is to be removed, in order to obtain a map of the interface, may e.g. be made in a CT-scanning unit placed upstream of the fat removing machine 1, and map data for the entire meat cut 2 may then be transmitted to the machine's control computer for use when the meat cut 2 is treated in the machine 1. CT-scanning has proved to give a very precise mapping, albeit at a large expense, and relevant methods are known.

According to the invention, other methods for mapping the fat-to-lean interface 22 may be used as well. For example, ultra-sound echo technique may be used for mapping the fat-to-lean interface 22. It may in this case be advantageous to remove rind 4a or skin from the first face of the meat cut 2, so that the fat to be removed is exposed prior to measuring the thickness of fat 4. An ultra-sound measuring head is dependent on an intimate contact with the meat cut for transferring the ultra-sound vibration efficiently to and from the meat cut 2, and such contact may by more easily obtained by contacting a fat surface than by contacting a rind 4a or skin surface. The rind 4a often tends to be rather rigid and unyielding whereas the fat 4 may well be quite yielding and compliant, thus providing for a good and efficiently sound-transmitting contact between an ultra-sound transceiver head and the meat cut 2. It may well be undesirable to put sound-transmitting fluid or gel onto the meat cut 2, as is normally used in the field of medicine when using ultra-sound echo measuring equipment on patients.

According to the invention, X-ray reflection technique may alternatively be utilised for mapping the fat-to-lean interface 22. X-ray reflection may be used in an echo mode rather the same way as ultra-sound echo technique, where X-rays are emitted towards the first face of the meat cut 2 and reflected from the discontinuity provided by the fat-to-lean interface 22. According to the invention, it is however envisaged that X-rays emitted at an oblique angle towards said first face, and reflected from the interface at a corresponding, oblique angle may yield better results.

As a further alternative, Sub-Surface Laser Scattering technique may be used for assessing the thickness of fat. By this technique, light from a Laser Light Emitting Diode (LED) is emitted towards said first face of the meat cut 2, and light emitted from the surrounding surface is detected or assessed. This technique is known from measuring inter alia turbidity in fluids. As fat and rind are both translucent, the light will penetrate the surface (with or without rind or skin) and will be scattered in the subcutaneous fat so that some of the light will illuminate part of the surface surrounding the point of entrance of the light from the Laser LED. The diameter of the illuminated area and the intensity of the illumination will provide suitable information, from which the local thickness of the layer of subcutaneous fat may be assessed by suitable computation methods.

Alternatively, interface curvature and position information for any section of the meat cut 2 must be available immediately prior to the section of the meat cut 2 arriving at the knife tool 12. The curvature and position of the fat-to-lean interface 22 may then be progressively scanned a short distance upstream of the knife tool 12 of the fat removing machine 1. A scanning unit 23 (FIGS. 1-2) for scanning a short section of the meat cut 2 may preferably be arranged in immediate connection with the conveyor belt 9 bringing the meat cut 2 into the middle section of the fat removing machine 1.

If no slip may be expected between the conveyor belt 9 and the meat cut 2, the movement of the conveyor belt 9 may be utilised to indicate the position of the meat cut 2 in the direction of transport. Instead of the conveyor belt 9, e.g. the resilient traction roller 11 or the toothed traction roller 10 may be utilised for indicating position. If slip is to be expected, the position of the meat cut 2 must be detected by separate means.

As an alternative, or in addition to, such scanned data, previously stored data describing a typical thickness-of-fat distribution in a meat cut 2 of the type in question may be used. The build or bodily constitution of slaughter animals often falls within a limited number of types, and thickness-of-fat distribution data for each type may be registered. The thickness-of-fat distribution for a particular meat cut may then be reproduced with satisfactory precision on the basis of the stored data for its type, together with its size and/or weight.

As a further alternative to scanned data, sampled data may be used. If the thickness of fat is sampled in a few points over the face of the meat cut 2 by e.g. ultrasound echo technique, the sample values of fat thickness may be combined with previously stored data to estimate the continuous distribution of the thickness of fat over the entire meat cut. The sampling may be carried out in a separate station upstream of the entire fat removing machine 1, or a sampling station 23 with sampling heads 23a may be arranged in connection with the conveyor belt 9. Several techniques of invasive measuring of fat thickness are known, which may also be used, that is, thickness of fat measured by inserting a needle means with optical detector means through the rind of a pork cut, through the fat and into the lean.

According to the invention, data from the measurements made on the meat cut in or upstream of the fat removing machine 1 may be utilised for subsequent sorting or presorting of the meat cuts 2 from which fat has been removed. The data may be combined or correlated with data from the slaughterhouse's order book so as to obtain a sorting or presorting into different shipments of meat. The measurements made for the purpose of controlling the fat removing machine 1 will be particularly well suited for sorting the meat cut 2 from which fat has been removed, into different classes or for shipment to different customers or markets.

LIST OF REFERENCE DESIGNATIONS 1 fat removing machine
2 meat cut
3 the lean of the meat cut
4a the skin part of the meat cut
5 conveyor belt
6 conveyor belt roller
7 guide plate
8 guide plate bar
9 conveyor belt
10 toothed traction roller
10a toothed scraper bar
11 resilient traction roller
12 knife tool
13 blade part
13a cutting edge
14 blade part support
15 shaft
15a axis
16 control rods
17 actuator box
18 direction of movement of knife tool
18a direction of movement of knife tool
18b direction of movement of knife tool
19 conveyor belt
20 conveyor belt
21 conveyor belt
22 fat-to-lean interface
23 measuring station
23a measuring devices
24 stationary support surface
49 direction of transport

The invention claimed is:

1. A method for removing fat from a first face of a meat cut, said meat cut having a length and a width, and said first face extending along said length and said width, the method comprising:
   estimating the shape and position of a fat-to-lean interface between lean and fat in said meat cut,
   pressing said first face of the meat cut against a support ex-tending in a direction transverse to a transport path,
   moving the meat cut in its lengthwise direction along the trans-port path and past a knife tool having a cutting edge, whereby the knife tool cuts a layer of fat and possibly skin from said first face, the knife tool being adapted to cut across the entire width of said meat cut so as to allow the trimming of the fat with possible skin from the rest of the meat cut as one single piece of fat, wherein
   the method further comprises
   determining, based on said estimated shape and position of a fat-to-lean interface, a desired trimming interface extending along the length and width of said meat cut,
   providing a knife tool comprising at least two controllable blade parts, each blade part having a cutting edge, the blade parts extending between said first face and said fat-to-lean interface without intersecting said first face, and
   continuously adapting, by controlling said at least two controllable blade parts, a position of each of said cutting edges and an angle of each of said blade parts with respect to said support to cut following said desired trimming interface, whereby the fat with possible skin is trimmed from said lean as said one single piece of fat.

2. A method according to claim 1, wherein said at least two controllable blade parts are so controllable that each cutting edge of said at least two controllable blade parts may be brought into and away from a position, in which it, together with an adjacent cutting edge, forms a continuous cutting edge, extending between said first face and said fat-to-lean interface.

3. A method according to claim 1, wherein each of said at least two controllable blade parts are swingable about an axis extending transverse to said lengthwise direction and parallel to said support.

4. A method according to claim 3, wherein said at least two controllable blade parts are swingable about a common axis.

5. A method according to claim 1, wherein said shape and position of the fat-to-lean interface is estimated based on experience values and the dimensions and weight of the meat cut.

6. A method according to claim 1, wherein said shape and position of the fat-to-lean interface is determined measuring the thickness of said layer of fat and possibly skin by invasive or non-invasive measuring.

7. A method according to claim 1 wherein said support is a roller.

8. A method according to claim 1 wherein said trimming interface essentially coincides with said fat-to-lean interface.

9. An apparatus for removing fat from a first face of a meat cut, where said meat cut comprises fat and lean separated by a fat-to-lean interface, said meat cut has a length and a width, and where said first face extends along said length and said width, said apparatus comprising:
   conveying means for moving the meat cut along a transport path,
   a support extending essentially linearly in a direction transverse to the transport path,
   wherein said conveying means is adapted for moving the meat cut in its lengthwise direction along said transport path and past a knife tool with a cutting edge whereby the knife tool cuts a layer of fat and possibly skin from said first face, the knife tool being adapted to cut across the entire width of said meat cut so as to allow the trimming of the fat and possible skin from the rest of said meat cut as one single piece of fat, wherein
   the apparatus further comprises means for determining, based on estimated shape and position of a fat-to-lean interface, the desired trimming interface extending along the length and width of said meat cut, a knife tool comprising at least two controllable blade parts, each comprising a cutting edge, the blade parts extending between said first face and said fat-to-lean interface without intersecting said first face, and means for continuously adapting, by controlling said at least two controllable blade parts, a position of each of the cutting edges and an angle of each of said blade parts with respect to said support to cut following said desired trimming interface, whereby the fat and possible skin is trimmed from said lean as said one single piece of fat.

10. An apparatus according to claim 9, wherein said at least two controllable blade parts are so controllable that each cutting edge of said at least two controllable blade parts may be brought into and away from a position, in which it, together with an adjacent cutting edge, forms a continuous cutting edge, extending between said first face and said fat-to-lean interface.

11. An apparatus according to claim 9, wherein each of said at least two controllable blade parts are swingable about an axis extending transverse to said lengthwise direction and parallel to said support.

12. An apparatus according to claim 11, wherein said at least two controllable blade parts are swingable about a common axis.

13. An apparatus according to claim 9, wherein said means for estimating the shape of the fat-to-lean interface comprises a database holding experience values of fat thickness distribution in dependency of the dimensions and weight of the meat cut.

14. An apparatus according to claim 9, comprising a measuring station for measuring the thickness of said layer of fat and possibly skin.

15. An apparatus according to claim 9 wherein said support is a roller.

16. An apparatus for removing fat from a first face of a meat cut, where said meat cut comprises fat and lean separated by a fat-to-lean interface, said meat cut has a length and a width, and where said first face extends along said length and said width, said apparatus comprising:

conveying means for moving the meat cut along a transport path, a support extending essentially linearly in a direction transverse to the transport path, wherein said conveying means is adapted for moving the meat cut in its lengthwise direction along said transport path and past a knife tool with a cutting edge whereby the knife tool cuts a layer of fat and possibly skin from said first face, the knife tool being adapted to cut across the entire width of said meat cut, wherein the apparatus further comprises means for determining a de-sired trimming interface extending along the length and width of said meat cut, a knife tool comprising at least two controllable blade parts, each comprising a cutting edge, the blade parts extending between said first face and said fat-to-lean interface without intersecting said first face, and means for adapting, by controlling said at least two controllable blade parts, a position of each of the cutting edges and an angle of each of said blade parts with respect to said support to cut following said desired trimming interface.

17. An apparatus according to claim 16, wherein said at least two controllable blade parts are so controllable that each cutting edge of said at least two controllable blade parts may be brought into and away from a position, in which it, together with an adjacent cutting edge, forms a continuous cutting edge, extending between said first face and said fat-to-lean interface.

18. An apparatus according to claim 16, wherein each of said at least two controllable blade parts are swingable about an axis extending transverse to said lengthwise direction and parallel to said support.

19. An apparatus according to claim 18, wherein said at least two controllable blade parts are swingable about a common axis.

20. An apparatus according to claim 16 wherein said support is a roller.

* * * * *